Nov. 7, 1961  J. W. GRAY ET AL  3,007,338
WIND COMPUTER
Filed Sept. 27, 1955  3 Sheets-Sheet 1

INVENTORS.
JOHN W. GRAY
WILLIAM J. TULL
BY
ATTORNEY.

Nov. 7, 1961
J. W. GRAY ET AL
3,007,338
WIND COMPUTER
Filed Sept. 27, 1955
3 Sheets-Sheet 2
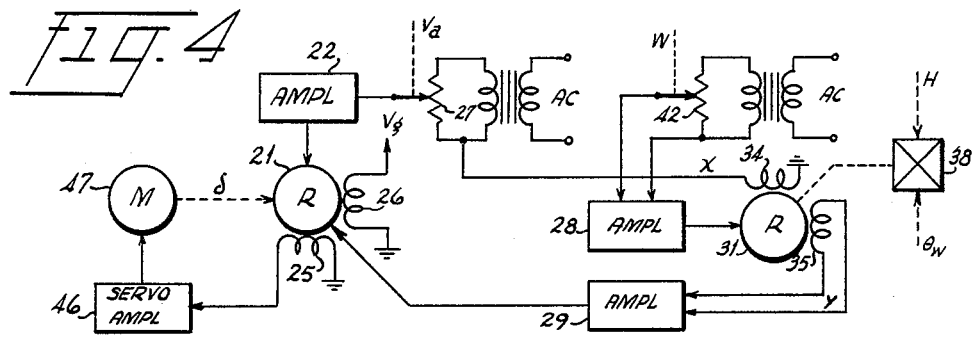
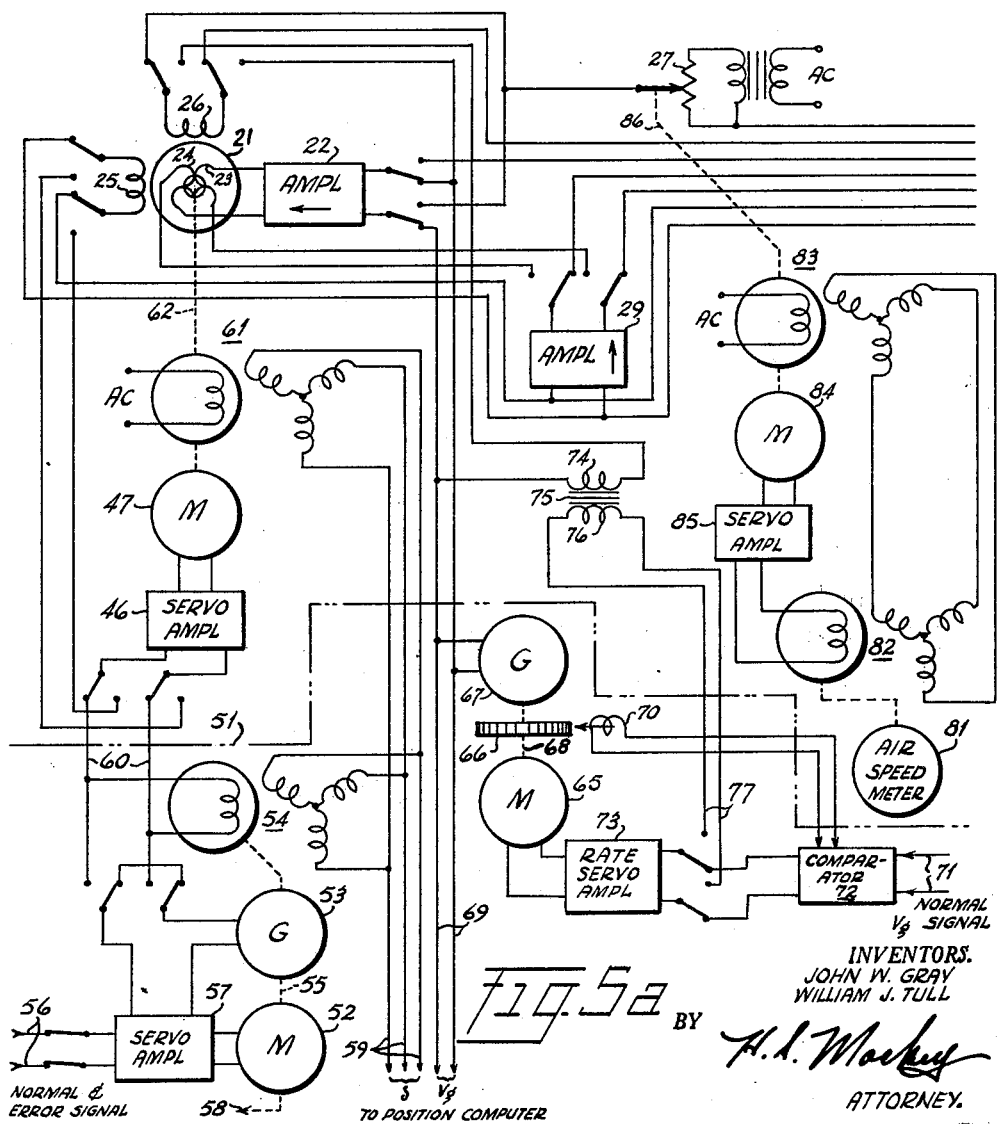
INVENTORS.
JOHN W. GRAY
WILLIAM J. TULL
BY
ATTORNEY.

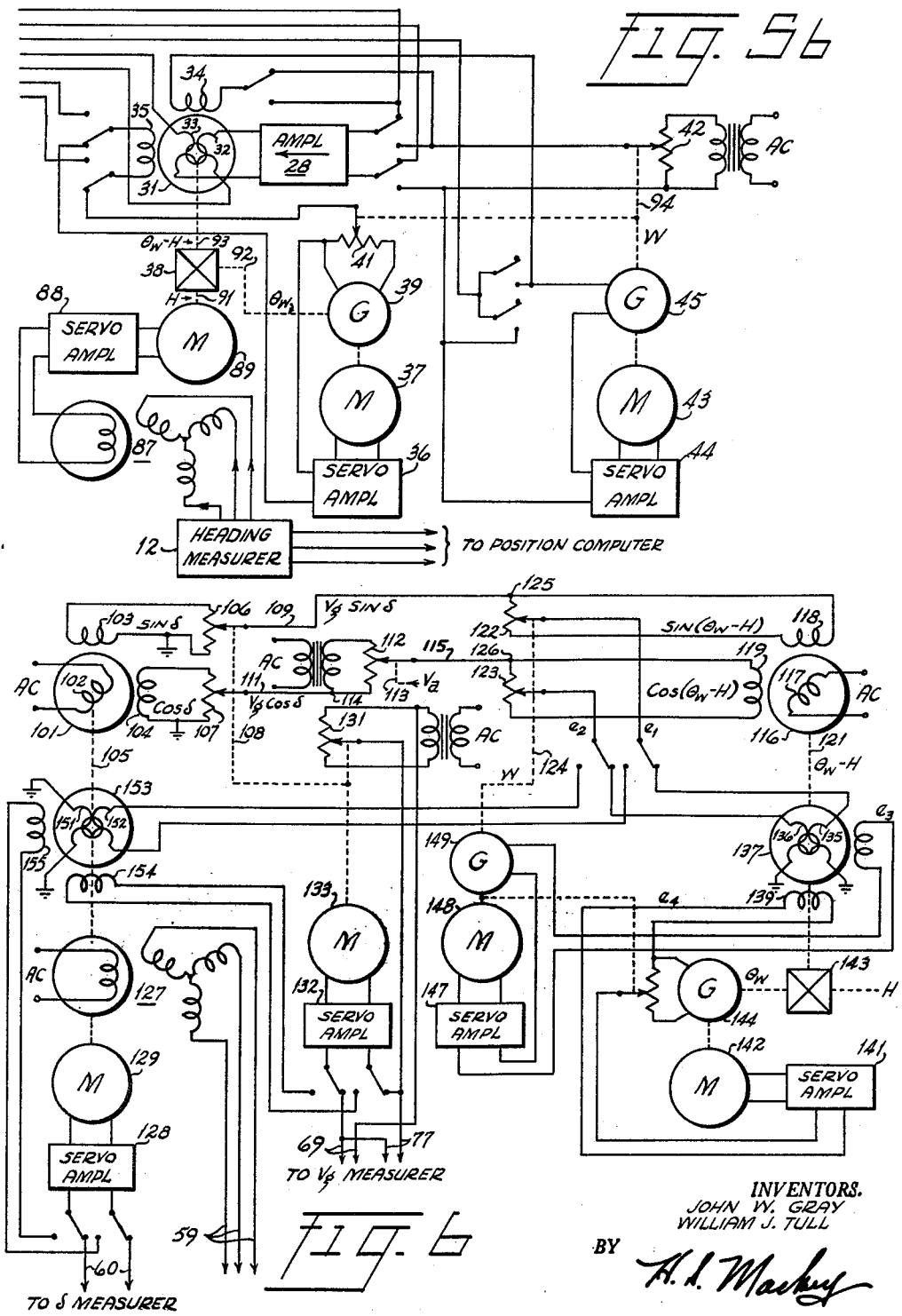

United States Patent Office 3,007,338
Patented Nov. 7, 1961

3,007,338
WIND COMPUTER
John W. Gray and William J. Tull, Pleasantville, N.Y., assignors to General Precision, Inc., a corporation of Delaware
Filed Sept. 27, 1955, Ser. No. 537,011
8 Claims. (Cl. 73—178)

This invention relates in general to dead reckoning position computers and more particularly to apparatus for allowing continuous computation of position even if some of the input data normally supplied are temporarily absent.

A dead reckoning computer can be constructed which will compute and indicate continuously the present position of an aircraft in flight provided that the position of the craft at the start of the flight is known and provided that there is continuously available data indicative of heading angle, drift angle and ground speed. The heading angle may be determined by means of magnetic, astral or gyroscopic compasses, or combinations thereof. Radio apparatus has recently been developed which continuously measures the drift angle and the ground speed of the aircraft by means contained within the aircraft itself, totally independent of ground stations.

Computers as above described have been developed to indicated present position with a high degree of accuracy as long as the radio apparatus continues to determine ground speed and drift angle accurately. However, the signals from the radio apparatus may be temporarily interrupted or unreliable. For example, atmospheric conditions or the nature of the terrain over which the craft is flying may cause the signal-to-noise ratio to drop to the point where reliable operation is impossible. In the case of military aircraft, the tactical situation may require periods of radio silence. Under such conditions, the position computer should not cease its operation entirely, but should continue to compute present position from the best information available. Position computer operation with only a portion of the normally available input data is often termer "memory" operation and some form of "memory" operation is usually provided for.

The determination of heading angle is not affected by the inoperativeness of the radio apparatus so that one form of memory operation may be secured by assuming that the drift angle and ground speed remain constant at the value obtaining when the radio apparatus ceases to function. This may be accomplished by supplying the position computer with the last determined, or "remembered," values of drift angle and ground speed, whereupon the computer will continue to operate and indicate present position. A change in speed of the aircraft obviously causes an incorrect value of ground speed to be fed to the computer, and will, in general, cause a change in drift angle since drift angle is one angle of the triangle comprising the vectors representing ground speed and direction, air speed and direction, and wind speed and direction. For the same reason, a change of course will affect both drift angle and ground speed. It is therefore apparent that the foregoing method of operation will yield satisfactory results only if the aircraft alters neither its course nor speed during memory operation.

It is an object of this invention to provide apparatus which will allow the aircraft to maneuver during periods of inoperativeness of the radio apparatus without seriously affecting the accuracy of the indication of the position computer.

In accordance with the invention, operation in the memory mode is secured by assuming that wind speed and wind direction remain constant. To this end, a wind computer is provided which normally computes wind speed and wind direction continuously from data indicative of heading angle, air speed, ground speed, and drift angle. Normally, no use is made of these computed values of wind speed and wind direction. During memory operation, the connections are altered so that ground speed and drift angle are computed from heading angle, air speed, wind speed, and wind direction. These computed values of ground speed and drift angle, instead of the normally measured values, are supplied to the position computer.

For a clearer understanding of the invention, reference may be made to the accompanying drawing, in which:

FIGURE 4 is a functional diagram of the wind computer depicting operation in the memory mode;

FIGURES 5a and 5b taken together comprise a circuit diagram of the wind computer; and FIGURE 6 is a circuit diagram of another embodiment of the invention.

Figure 1:
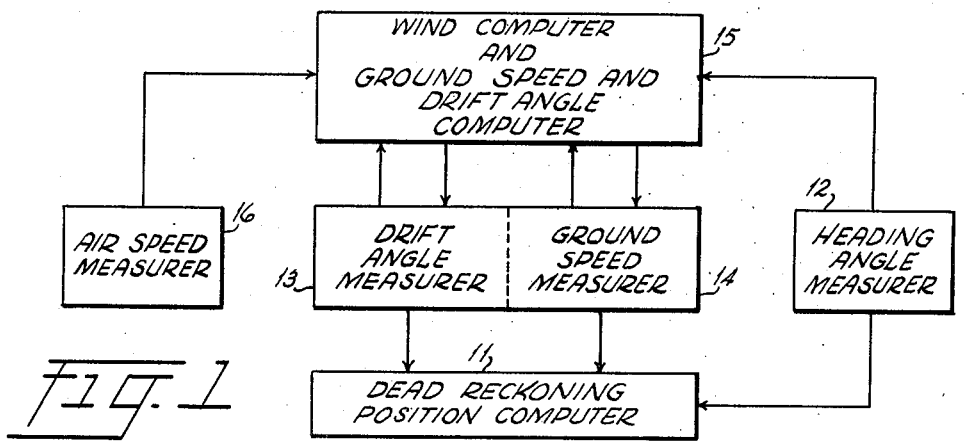
FIGURE 1 is a block diagram of a navigation system including the invention.

Referring first to FIG. 1, there is shown a dead reckoning position computer 11 which continuously computes the present position of an aircraft in flight, starting with the position at the beginning of the flight. A heading angle measurer 12, which may be a magnetic, astral, or gyroscopic instrument, or a combination thereof, continuously supplies information indicative of the heading angle to the computer 11. A drift angle measurer 13 supplies information indicative of the drift angle of the aircraft while a ground speed measurer 14 supplies information indicative of the actual ground speed of the aircraft to the computer 11. The drift angle measurer 13 and the ground speed measurer 14 may comprise radio apparatus, either alone or in combination with inertial elements. The computer 11, heading angle measurer 12, drift angle measurer 13 and ground speed measurer 14 may, for example, be similar to the apparatus described in the copending application of Tull and Gillette, Serial No. 749,184, filed May 20, 1947, now Patent No. 2,869,118 for "Navigation System" or to that described in the copending application of Gray, Hales and Greenwood, Serial No. 410,882, filed February 17, 1954, now Patent No. 2,908,902, for "World Wide Navigation System."

There is provided a wind computer 15 which is normally supplied with data indicative of drift angle and ground speed from the radio apparatus. An air speed measurer 16 supplies air speed information, while heading information is supplied by the heading angle measurer 12. With this information, it is possible to compute wind speed and wind direction. When the radio apparatus ceases to function, the connections in the wind computer are changed so that it computes drift angle and ground speed and supplies this information to the position computer 11.

Figure 2:
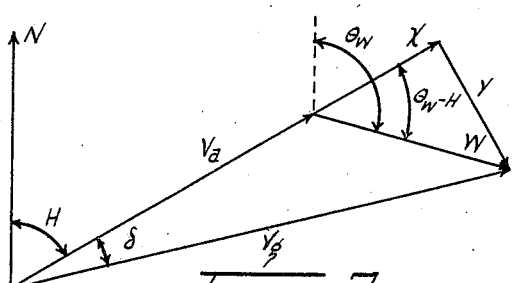
FIGURE 2 is a diagram of the wind triangles which are solved in accordance with the invention.

FIG. 2 illustrates one of several possible geometric configurations which may be solved to compute wind speed and direction in the normal mode of operation and to compute ground speed and drift angle in the memory mode. There is shown the vector triangle comprising the air speed vector, $V_a$, the wind speed vector W and the ground speed vector $V_g$. The heading angle, H, is the angle between true north and the air speed vector while the drift angle, $\delta$, is the angle between the air speed and ground speed vectors. The wind vector W is thought of as comprising two components, the first, X, being parallel to the air speed vector $V_a$ and the second, Y, being perpendicular thereto. It is apparent from the figure that $V_g \sin \delta$ is equal to Y, while $V_g \cos \delta$ is equal to $V_a+X$. By subtracting $V_a$ from $V_g \cos \delta$, $X$ is obtained. $X$ and $Y$, together with the heading angle $H$, may be resolved to secure wind speed $W$ and wind direction $\theta_w$. A similar calculation can be made to compute $V_g$, i.e., ground speed, and $\delta$ from $W$ and $\theta_w$.

Figure 3:
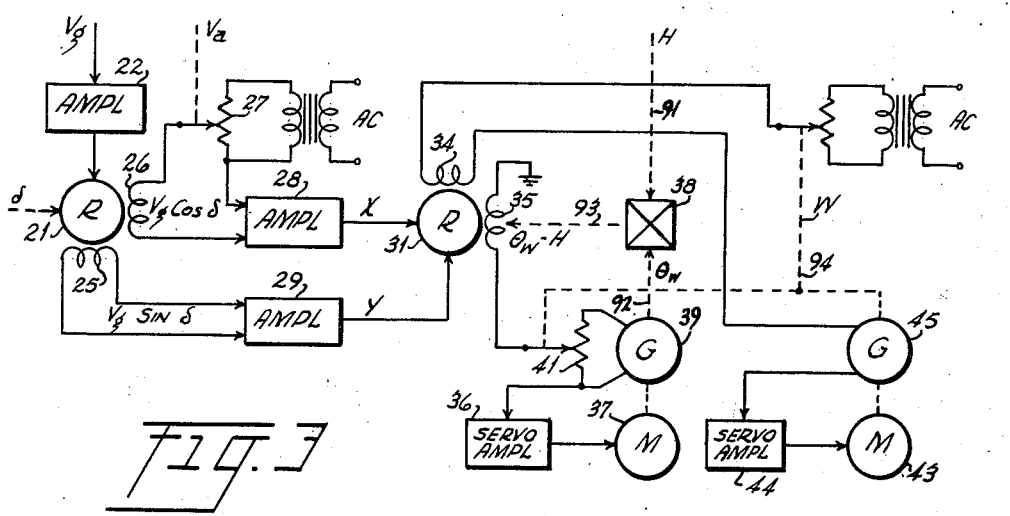
FIGURE 3 is a functional diagram of the wind computer depicting operation during the normal mode.

FIGURES 3 and 4 show an instrumentation for solving the triangles of FIG. 2. Two resolvers are used, each resolver comprising a stator portion and a rotor portion, each portion having wound thereon two mutually perpendicular coils. It is obvious that if a voltage be applied to one of the rotor coils that the stator coils will have induced in them voltages proportional to the applied voltage times the sine and cosine respectively of the angular position of the rotor shaft.

Referring now to FIG. 3, a resolver 21 has its rotor positioned in accordance with the angle $\delta$ as determined by the drift angle measurer 13 of FIG. 1. A voltage proportional to ground speed is applied through amplifier 22 to one rotor winding of the resolver 21. One stator winding 25 will have induced therein a voltage proportional to $V_g \sin \delta$ while the other winding 26 will have induced in it a voltage proportional to $V_g \cos \delta$. A potentiometer 27 connected across an A.C. source is positioned in accordance with the value of air speed $V_a$. This voltage is subtracted from the voltage of coil 26 and the resulting voltage is proportional to $X$. The voltage of coil 25 is proportional to $Y$. These voltages proportional to $X$ and $Y$ are passed through amplifiers 28 and 29 respectively and are applied to the rotor windings of a second resolver 31. The rotor of the resolver 31 is rotated until the output of stator coil 35 is zero at which point the voltage of winding 34 will be proportional to wind speed. In order to so rotate the shaft of resolver 31, the output of winding 35 is used as an error signal which feeds a servo amplifier 36 which drives a motor 37. A portion of the output of a tachometer generator 39, rotated by the motor 37, is connected in series opposition to the error signal from winding 35 for a purpose which will be explained subsequently. The shaft 93 of resolver 31 is connected to the output of a mechanical differential 38 one input shaft 91 of which is positioned in accordance with the heading angle and the other of which is connected to the shaft 92 of the motor 37. It is apparent that when the output of winding 35 is zero, the position of the shaft 93 of resolver 31 will be indicative of the angle $\theta_w - H$ and the position of the motor shaft 92 will be indicative of the angle $\theta_w$.

The voltage of winding 34 which is proportional to wind speed is converted to a shaft position by comparing this voltage with the voltage of a potentiometer 42 which is connected to a source of alternating current. The difference in these two voltages is used as an error signal to position the shaft 94 of potentiometer 42 by means of a motor 43 operated by servo amplifier 44. A tachometer generator 45 is also used in this loop.

The two tachometer generators 39 and 45 are included in their respective servo loops in order to give the loops a long time constant so as to average the input data over a period of about thirty to sixty seconds. The apparatus may be shifted to memory operation at any time and it is therefore desirable to compute average values of wind speed and direction in order to prevent using transient or erroneous values as inputs during memory operation.

The apparatus has been designed to operate over a large range of wind speed values and it has been found that, at low values of wind speed, the application of the full voltage of generator 39 causes the servo loop to have an excessively large time constant. To correct this situation, a potentiometer 41 having its slider operated by the shaft 94 is connected across generator 31 so that the voltage introduced into the loop is reduced at low wind speeds. The result is a uniform time constant for all values of wind speed.

It is seen that in normal operation the wind computer provides two shaft positions, one proportional to wind speed $W$, and the other proportional to wind direction $\theta_w$. In order to compute ground speed and drift angle these two shafts are maintained fixed so that the computer may be said to "store" or "remember" the last computed values of $W$ and $\theta_w$. At the same time, the connections of the apparatus are switched to the configuration shown in FIG. 4. The voltage proportional to wind speed from potentiometer 42 is passed through amplifier 28 to one rotor winding of the resolver 31. The shaft of the resolver is positioned at the angle $\theta_w - H$ so that the stator windings 34 and 35 have induced in them voltages proportional to $X$ and $Y$ respectively. To the voltage $X$ there is added a voltage proportional to air speed from the potentiometer 27 the sum being passed through amplifier 22 to one rotor winding of the resolver 21. The $Y$ voltage is passed through amplifier 29 to the other rotor winding of resolver 21. The shaft of resolver 21 is positioned to the angle $\delta$ by zeroing the output of winding 25 by means of a servo amplifier 46 and a motor 47. The voltage induced in winding 26 will then be proportional to ground speed.

FIGURES 5a and 5b, taken together, are substantially composite circuit diagrams of the circuits illustrated in FIGS. 3 and 4. FIGURES 5a and 5b also illustrate an example of how connections may be made between the wind computer and the drift angle and ground speed measurers. All of the switches shown are illustrated in the position for forming the connections shown in FIG. 3, while when all the switches are in their opposite positions the circuit of FIG. 4 is formed.

Referring first to FIG. 5a, the apparatus below the dashed line 51 represents a portion of the apparatus comprising the drift angle measurer 13 and the ground speed measurer 14. There is shown a motor 52, a generator 53 and a synchro control transformer 54 mounted on a common shaft 55. In normal operation, a drift angle error signal is received via conductors 56 and applied through a servo amplifier 57 to the motor 52. This signal causes the motor 52 to rotate until the position of the shaft 55 represents the drift angle $\delta$. The extension 58 of the shaft 55 is connected back to the angle measuring apparatus to reduce the error signal to zero as the shaft is servoed to its proper positon. The generator 53 is of the induction type whose output is a constant frequency and whose amplitude is proportional to the speed of rotation of its shaft. The output of generator 53 is fed back to the servo amplifier 57 in order to average the input data. The control transformer 54 has its stator windings connected to conductors 59 which transmit information indicative of the position of shaft 55 to the position computer. The conductors 59 are also connected to the stator windings of a synchro transmitter 61 which is mounted on a shaft 62 which is common to synchro transmitter 61, motor 47, and resolver 21. The voltage of the rotor winding of control transformer 54 constitutes an error signal representing the error in the position of shaft 62 and is connected via conductors 60 to the servo amplifier 46 to drive motor 47 until the position of shaft 62 corresponds to the position of shaft 55. The position of shaft 62 therefore also represents the drift angle $\delta$ and positions the rotor of resolver 21. As explained in connection with FIG. 3, the voltage induced in stator winding 25 of the resolver 21 represents $V_g \sin \delta$ while the voltage induced in winding 26 represents $V_g \cos \delta$.

During memory operation the output of winding 25 is connected to servo amplifier 46 which drives motor 47 to position shaft 62 in accordance with the computed value of drift angle, $\delta$. The voltage of the rotor winding of control transformer 54 now constitutes an error signal indicative of the error of the position of shaft 55 and is connected to the servo amplifier 57 to drive motor 52 until the position of shaft 55 corresponds to that of shaft 62. At this time the normal error signal from conductors 56 is disconnected from servo amplifier 57.

The portion of the ground speed measurer 14 shown in FIG. 5a comprises a motor 65, a tone wheel 66 and a generator 67, mounted on a common shaft 68. The shaft 68 is normally driven at a speed proportional to the ground speed $V_g$. The generator 67 is similar to the generator 53 and its output is a voltage of constant frequency whose magnitude is proportional to ground speed. The output of generator 67 is connected to conductors 69 which lead the ground speed signal to the position computer and also, through amplifier 22, to the rotor winding 23 of the resolver 21.

The tone wheel 66 is a magnetic wheel having serrations, or teeth, around its periphery. Associated with the wheel 66 is a magnetic pickup 70 which has induced therein a voltage whose frequency is proportional to the speed of rotation of the shaft 68. There is normally provided on conductors 71 a signal consisting of an alternating voltage the frequency of which is proportional to the ground speed of the aircraft. This signal is compared in a comparator 72 with a signal from pickup 70 and if the two signals are not indicative of the same ground speed an error signal is developed which operates through the rate servo amplifier 73 to increase or decrease the speed of the motor 65 until the speed of rotation of shaft 68 is precisely proportional to the ground speed as indicated by the signal on conductors 71. As previously mentioned, this causes the generator 67 to place a voltage on conductors 69 whose magnitude is proportional to the ground speed, $V_g$.

During memory operation, the voltage induced in winding 26 of the resolver 21 is proportional to computed ground speed and is compared in the primary 74 of a transformer 75 with the voltage on conductors 69. Any difference in these voltages causes a voltage to be induced in the secondary 76 of transformer 75 and this error signal is led via conductors 77 to the rate servo amplifier 73 to adjust the speed of motor 65. At this time, the normal signal from the comparator 72 is disconnected.

An air speed meter 81 has its shaft connected to a synchro control transformer 82 for the purpose of transmitting the shaft position of the meter 81 to the wind computer. To this end a synchro transmitter 83 is mounted on the same shaft as the potentiometer 27 and a motor 84. The stator windings of synchros 82 and 83 are connected together. The voltage induced in the rotor winding of control transformer 82 constitutes an error signal which drives motor 84 through servo amplifier 85 so as to position the common shaft 86 in accordance with the position of the shaft of the meter 81. The connections of this servo loop remain the same during both normal and memory operation so that the potentiometer 27 at all times yields a voltage proportional to air speed. During normal operation this voltage is subtracted from the voltage of winding 26 of resolver 21 to form the component X. During memory operation the voltage of potentiometer 27 is added to the voltage of winding 34 of resolver 31 (FIG. 5b) to form a voltage proportional to $V_a+X$.

Referring now to FIG. 5b, the heading measurer 12 provides three-wire information indicative of heading angle. These three wires are connected to a control transformer 87 whose rotor winding, through servo amplifier 88, drives a motor 89 so as to position the shaft 91 in accordance with the heading angle. The shaft 91 is connected to one input of the mechanical differential 38, the other input coming from shaft 92 which is connected to the generator 39 and the motor 37. As pointed out in connection with FIG. 3, the position of shaft 92 represents the wind direction $\theta_w$. The output of the differential 38 appears on shaft 93 which positions the rotor of resolver 31 at the angle $\theta_w - H$.

The motor 43, generator 45 and potentiometer 42, are mounted on a common shaft 94. As previously explained, the angular position of shaft 94 is indicative of wind speed.

All of the motors, that is, motors 47, 52, 65, 84, 89, 37 and 43 may be two phase alternating current motors, having one winding connected to a source of alternating current and whose speed and direction of rotation are controlled by the magnitude and phase of the voltage applied to the other winding. The main windings and other connections to the alternating current supply have been omitted from the drawing in the interest of clarity.

During the memory mode of operation, the shafts 92 and 94 indicative of wind direction and wind speed respectively, are fixed in position. It will be noticed from the drawing that the inputs to the servo amplifiers 36 and 44 are removed during memory operation, and, if necessary, the alternating current excitation of motors 37 and 43 may also be removed.

FIGURE 6 illustrates another instrumentation for solving the triangle of FIGURE 2. It is apparent from FIG. 2 that $$V_g \sin \delta = W \sin (\theta_w - H) \quad (1)$$

and $$V_g \cos \delta - V_a = W \cos (\theta_w - H) \quad (2)$$

These two equations may be solved simultaneously for any two unknowns. The apparatus of FIGURE 6 sets up these equations and, in the normal mode of operation, solves them for W and $\theta_w$, while in the memory mode the equations are solved for $V_g$ and $\delta$.

A resolver 101 comprising a rotor coil 102 and two stator coils 103 and 104 is mounted to have its rotor positioned by a shaft 105. The rotor coil 102 is connected to a source of alternating current. If the shaft 105 is positioned in accordance with the drift angle, $\delta$, it is apparent that the voltage induced in stator coil 103 will be proportional to $\sin \delta$ while the voltage induced in stator coil 104 will be proportional to $\cos \delta$. The outputs of coils 103 and 104 are connected across potentiometers 106 and 107 respectively. The sliders of these potentiometers are positioned by a common shaft 108. One extremity of each potentiometer is grounded and the outputs appear on conductors 109 and 111 respectively which are connected to the sliders. If the shaft 108 is positioned in accordance with $V_g$, it is apparent that the potential of conductor 109 with respect to ground will be proportional to $V_g \sin \delta$ while the potential of conductor 111 with respect to ground will be proportional to $V_g \cos \delta$.

A potentiometer 112 is connected across a source of alternating current and its slider is positioned by a shaft 113. The angular position of shaft 113 is proportional to air speed, $V_a$. The positioning of this shaft may be accomplished in any desired manner, for example, in the same manner as that shown in FIGURE 5a for the positioning of shaft 86. One extremity of the potentiometer 112 is connected to the conductor 111 at the junction 114. The output of potentiometer 112 is taken from conductor 115 which is connected to the slider. The polarities are selected so that the voltage between the slider and the junction 114 is proportional to $-V_a$. It follows that the potential of conductor 115 with respect to ground is equal to $V_g \cos \delta - V_a$.

A resolver 116 comprising a rotor coil 117 and stator coils 118 and 119 is arranged to have its rotor positioned by the shaft 121. The rotor coil 117 is connected to a source of alternating current. If the shaft 121 is positioned at the angle $\theta_w - H$, the voltage induced in coil 118 will be proportional to $\sin (\theta_w - H)$ while the voltage induced in coil 119 will be proportional to $\cos (\theta_w - H)$. Potentiometers 122 and 123 are connected across coils 118 and 119 respectively and have their sliders connected for rotation by a common shaft 124. If the position of shaft 124 is proportional to wind speed, W, it can be seen that the potential of the sliders of potentiometers 122 and 123 with respect to the junctions 125 and 126 at the extremities of the potentiometers will be proportional respectively to $W \sin (\theta_w - H)$ and $W \cos (\theta_w - H)$. These voltages are connected in series with the voltages on conductors 109 and 115 respectively so that the voltages of the sliders of potentiometers 122 and 123 with respect to ground represent error signals which can be used to solve the previously mentioned equations. When these error signals are reduced to zero the equations are solved. With all of the switches in the positions illustrated, the normal mode of operation is secured and these error signals are used to determine W and $\theta_w$. In the memory mode, the switches are thrown to their opposite positions, and the error signals are used to determine $V_g$ and $\delta$.

In the normal mode shaft 105 is positioned in accordance with the angle $\delta$ in a manner similar to that described in connection with FIG. 5a. Three wire information is transmitted via conductors 59 to the drift angle measurer and an error signal is received via conductors 60. A synchro transmitter 127 is mounted on shaft 105 and has its stator windings connected to conductors 59. The error signal from conductors 60 is led to a servo amplifier 128 which drives a motor 129 which is also mounted on shaft 105. When the error signal has been reduced to zero the shaft 105 is positioned in accordance with the angle $\delta$. The conductors 59 and 60 may be connected to the drift angle measurer in the same manner as is shown in FIG. 5a.

A signal proportional to ground speed, $V_g$ is received from the ground speed measurer via conductors 69. This signal is converted to a shaft position by balancing this voltage against the voltage across a potentiometer 131 which is connected to a source of alternating current. The difference in these two voltages is led to a servo amplifier 132 which drives a motor 133 to adjust the voltage between the slider and one extremity of the potentiometer until this voltage is equal to the voltage on conductors 69. The motor 133 and the potentiometer 131 are both mounted on shaft 108 which is, therefore, positioned in accordance with the ground speed.

In the normal mode of operation, drift angle, ground speed and air speed are known and therefore the error signals from potentiometers 122 and 123 can be used to solve Equations 1 and 2 for wind speed, W, and wind direction minus heading angle, $\theta_w - H$. The voltages on conductors 109 and 115 will be proportional to $V_g \sin \delta$ and $V_g \cos \delta - V_a$, respectively. If the shafts 121 and 124 are assumed to be in any arbitrary positions denoted by $\theta$ and V respectively, then the voltages between the sliders of potentiometers 122 and 123 and the junctions 125 and 126 will be proportional to $V \sin \theta$ and $V \cos \theta$ respectively. The error signal voltages appearing between the sliders of potentiometers 122 and 123 and ground, and denoted by $e_1$ and $e_2$ respectively, then become $$e_1 = V_g \sin \delta - V \sin \theta, \quad (3)$$

and $$e_2 = V_g \cos \delta - V_a - V \cos \theta \quad (4)$$

Substituting from Equations 1 and 2, $$e_1 = W \sin (\theta_w - H) - V \sin \theta \quad (5)$$
$$e_2 = W \cos (\theta_w - H) - V \cos \theta \quad (6)$$

Inspection of Equations 5 and 6 shows that adjustment of V alone or of $\theta$ alone will, in general, affect both of the error voltages $e_1$ and $e_2$. It is therefore seen that it is not feasible to use the error signals $e_1$ and $e_2$ in their present form to position the shafts 121 and 124. However, $e_1$ and $e_2$ can be transformed into two new error signals, $e_3$ and $e_4$, each of which can be used to position one of the shafts.

A resolver 137 the rotor of which is mounted for rotation by the shaft 121 has its rotor windings 135 and 136 excited by the voltages $e_1$ and $e_2$ respectively. The voltage $e_3$ induced in the stator winding 138 will be $$e_3 = e_1 \sin \theta + e_2 \cos \theta$$
$$e_3 = W \sin (\theta_w - H) \sin \theta - V \sin^2 \theta + W \cos (\theta_w - H) \cos \theta - V \cos^2 \theta$$
$$e_3 = W \cos [(\theta_w - H) - \theta] - V \quad (7)$$

The voltage induced in the other stator winding 139 will be $$e_4 = e_1 \cos \theta - e_2 \sin \theta$$
$$e_4 = W \sin (\theta_w - H) \cos \theta - V \sin \theta \cos \theta - W \cos (\theta_w - H) \sin \theta + V \cos \theta \sin \theta$$
$$e_4 = W \sin [(\theta_w - H) - \theta] \quad (8)$$

It can be seen from Equation 8 that $e_4$ can be reduced to zero by adjusting $\theta$ only until $\theta = (\theta_w - H)$. It can be seen from Equation 7 that, when $\theta = (\theta_w - H)$, $e_3$ can vanish only if $W = V$.

The instrumentation for solving the equations is as follows. The voltage $e_4$ from winding 139 is led to a servo amplifier 141 which is connected to drive a motor 142. The shaft of motor 142 is connected to one input of a mechanical differential 143 and also has mounted on it a tachometer generator 144 which is used to average the input data as explained in connection with the generators 39 and 45 of FIG. 3. The output of generator 144 is varied in accordance with wind speed in the manner and for the purpose previously explained in connection with generator 39 of FIG. 3. The other input shaft of the differential 143 is positioned in accordance with the heading angle, H, by any desired means. For example, this may be done as shown in FIG. 5b in connection with the positioning of shaft 91. The output shaft of the differential 143 is connected to the shaft 121. The position of this shaft will be the difference between the position of the shaft of motor 142, which is proportional to wind direction $\theta_w$, and the heading angle shaft.

The output of coil 138 is connected to the input of a servo amplifier 147 which drives a motor 148 whose rotor is connected to the shaft 124. Also mounted on shaft 124 is a tachometer generator 149 whose output is connected in series with the output of coil 138 in order to average the input data. When the output signals from coils 138 and 139 have been reduced to zero, the angular position of shaft 121 will be proportional to the angle $\theta_w - H$, and the angular position of shaft 124 will be proportional to wind speed, W. The equations are then solved.

In the memory mode of operation, all of the switches are shifted to their opposite positions. This removes the error signals from the resolver 137 so that the shaft 124 and the shaft of motor 142 will remain stationary. If desired, the alternating current excitation may also be removed from motors 142 and 148. The error signals from potentiometers 122 and 123 are now connected to coils 151 and 152 respectively of a resolver 153 the rotor of which is mounted on shaft 105. The stator coils 154 and 155 of the resolver 153 provide error signals in the same manner as do coils 138 and 139 in the normal mode. The coil 155 is now connected to the servo amplifier 128 in place of the error signal from conductors 60. When this error signal has been reduced to zero the position of shaft 105 will represent the drift angle $\delta$, and this information is passed to the drift angle measurer by means of the synchro transmitter 127 and conductors 59. The output of coil 154 is connected to the input of the servo amplifier 132 so as to drive motor 133 and to position shaft 108 and the slider of potentiometer 131 in accordance with the ground speed. The voltage between the slider and one extremity of potentiometer 131 now represents computed ground speed. An error signal consisting of the difference between this computed value of ground speed and the value appearing on conductors 69 is passed to the ground speed measurer via conductors 77. Conductors 69 and 77 may be connected to the ground speed measurer in the same manner as shown in FIG. 5a.

The embodiment shown in FIGURE 6 has a number of advantages over that shown in FIGURES 5a and 5b. The same equations are used in both the normal and memory modes of operation and the same error signals are also used in both modes. If the error signals have been reduced to zero at the moment the apparatus is shifted from normal to memory mode, there will be no change between measured and computed values of ground speed and drift angle when the shift is made. The embodiment of FIG. 6 has eliminated the need for three booster amplifiers which, since they contain vacuum tubes, take up considerable space and are an added source of unreliability. It will also be noted that the embodiment of FIG. 6 requires far less switching than does the embodiment of FIGS. 5a and 5b.

The invention has been described with respect to two specific embodiments. However, many modifications may be made within the scope of the invention. For example, other geometrical configurations can be devised to compute wind speed and direction. For example, air speed and ground speed could be resolved into their north and east components and these components combined to give wind speed and direction. Many other modifications will occur to those skilled in the art.

What is claimed is:

1. A navigation system comprising, a dead reckoning position computer, means for measuring heading angle and supplying data indicative thereof to said computer, normally operative means for measuring drift angle and ground speed and supplying the measured data to said computer, means for measuring air speed, means for computing wind speed and direction from data indicative of heading angle, ground speed, drift angle and air speed while said normally operative means is operative and for computing drift angle and ground speed from data indicative of heading angle, air speed, and the last computed values of wind speed and direction while said normally operative means is inoperative, and means for supplying data indicative of the computed values of drift angle and ground speed to said position computer while said normally operative means is inoperative.

2. Apparatus for securing input data for a dead reckoning position computer comprising, means for measuring drift angle and ground speed, means for measuring heading angle, means for measuring air speed, means for normally selecting input data comprising the measured values of drift angle, ground speed and heading angle, means for normally computing wind speed and direction from the measured values of drift angle, ground speed, heading angle and air speed and for optionally computing drift angle and ground speed from the measured values of heading angle and air speed and from the last computed values of wind speed and direction, and means for optionally selecting input data comprising the measured value of heading angle and the computed values of drift angle and ground speed.

3. In a navigation system, apparatus for determining analog quantities representing wind speed and wind direction from analog quantities representing ground speed, drift angle, heading angle, and air speed comprising, means for resolving the analog quantities representing ground speed and drift angle into two other quantities representing two components, parallel and perpendicular respectively to the vector representing air speed and heading angle, means for subtracting the quantity representing air speed from said parallel component whereby two orthogonal components, together representative of wind speed and wind direction, are obtained, and means for resolving said orthogonal components to obtain two quantities, one representative of wind speed and the other representative of wind direction.

4. In a navigation system, apparatus for determining analog quantities representing ground speed and drift angle from analog quantities representing wind speed, wind direction, heading angle and air speed comprising, means for resolving the analog quantities representing wind speed and wind direction into two other quantities representing two components, parallel and perpendicular respectively to the vector representing air speed and heading angle, means for adding the quantity representing air speed to said parallel component whereby two orthogonal components, together representative of ground speed and drift angle, are obtained, and means for resolving said orthogonal components to obtain two quantities, one representative of ground speed and the other representative of drift angle.

5. A navigation system comprising a position computer, a first source of signals indicative of ground speed and drift angle, said first source comprising means for measuring ground speed, drift angle and heading angle, a second source of signals indicative of ground speed and drift angle, said second source including means for computing ground speed and drift angle from signals indicative of air speed, heading angle, wind speed and wind direction, and means for selectively applying the signals from either of said sources to said position computer.

6. A navigation system comprising, electromechanical computing means operable in either a first or a second mode depending upon whether a first or a second circuit configuration is established, said means operating in said first mode to continuously compute wind speed and wind direction from data indicative of heading angle, air speed, ground speed and drift angle, said means operating in said second mode to compute ground speed and drift angle from data indicative of heading angle, air speed, and the last computed values of wind speed and wind direction, and switch means for selectively establishing either said first circuit configuration or said second circuit configuration.

7. A navigation system comprising, means for measuring ground speed and drift angle, means for measuring air speed, means for measuring heading angle, electromechanical means connectable in either a first or a second circuit configuration, said electromechanical means when connected in said first circuit configuration being for computing wind speed and wind direction from the measured values of ground speed, drift angle, air speed, and heading angle, said electromechanical means when connected in said second circuit configuration being for storing the last computed values of wind speed and wind direction, and switch means for selectively establishing either said first or said second circuit configuration.

8. A navigation system comprising, means normally operative for continuously measuring ground speed and drift angle, means for continuously measuring air speed, means for continuously measuring heading angle, electromechanical means connectable in either a first or a second circuit configuration, said electromechanical means when connected in said first circuit configuration being for continuously computing wind speed and wind direction from the measured values of ground speed, drift angle, air speed, and heading angle, said electromechanical means when connected in said second circuit configuration being for continuously computing ground speed and drift angle from the measured values of air speed and heading angle and the last computed values of wind speed and wind direction, and switch means for selectively establishing either said first or said second circuit configuration.

References Cited in the file of this patent

UNITED STATES PATENTS

| | | |
|---|---|---|
| 1,985,265 | Smith | Dec. 25, 1934 |
| 2,533,256 | Wilkie | Dec. 12, 1950 |
| 2,560,527 | Dehmel | July 10, 1951 |
| 2,652,979 | Chance | Sept. 22, 1953 |
| 2,715,995 | Wirkler | Aug. 23, 1955 |